United States Patent
Yamanaka et al.

(10) Patent No.: US 6,707,182 B2
(45) Date of Patent: Mar. 16, 2004

(54) ELECTRIC POWER STEERING APPARATUS AND METHOD FOR PRODUCING THE SAME

(75) Inventors: Kohei Yamanaka, Kanagawa-ken (JP); Mamoru Ichikawa, Kanagawa-ken (JP)

(73) Assignee: Unisia JKC Steering Systems Co., Ltd., Atsugi (JP)

( * ) Notice: Subject to any disclaimer, the term of this patent is extended or adjusted under 35 U.S.C. 154(b) by 0 days.

(21) Appl. No.: 10/319,825

(22) Filed: Dec. 16, 2002

(65) Prior Publication Data

US 2003/0136604 A1 Jul. 24, 2003

(30) Foreign Application Priority Data

Dec. 17, 2001 (JP) ........................................ 2001-383568

(51) Int. Cl.⁷ ................................................. H02K 7/00
(52) U.S. Cl. ................ 310/67 R; 310/68 B; 73/862.33; 73/1; 180/444
(58) Field of Search .............................. 310/67 R, 68 B, 310/89; 74/862.331–862.339; 180/444, 446

(56) References Cited

U.S. PATENT DOCUMENTS

| 4,356,732 | A | | 11/1982 | Hachtel et al. | |
|---|---|---|---|---|---|
| 5,394,760 | A | * | 3/1995 | Persson et al. | 73/862.331 |
| 5,585,573 | A | * | 12/1996 | Satoh et al. | 73/862.331 |
| 5,739,616 | A | * | 4/1998 | Chikaraishi et al. | 310/194 |
| 5,796,014 | A | * | 8/1998 | Chikaraishi et al. | 73/862.331 |
| 5,906,250 | A | * | 5/1999 | Haga et al. | 180/444 |
| 6,239,529 | B1 | * | 5/2001 | Chikaraishi | 310/194 |
| 6,382,034 | B1 | * | 5/2002 | Yasui et al. | 73/862.08 |
| 6,386,052 | B1 | * | 5/2002 | Satoh et al. | 73/862.333 |
| 6,557,425 | B2 | * | 5/2003 | Kamiya et al. | 73/862.334 |

FOREIGN PATENT DOCUMENTS

JP            2-132336 A            5/1990

\* cited by examiner

*Primary Examiner*—Thanh Lam
(74) *Attorney, Agent, or Firm*—Foley & Lardner

(57) ABSTRACT

An electric power steering apparatus is disclosed. The apparatus features a first shaft and a second shaft connected by an elastic member. A first detecting member is coupled to the second shaft, and made of magnetic material with a plurality of radial notched portions defining a number of slots. A pair of second detecting members are coupled to the first shaft and positioned on both sides of the first detecting member, and made of conductive and non-magnetic material with a plurality of radial notched portions defining a like number of slots. A pair of detecting coils are axially positioned on both sides of a set of the first and second detecting members. A housing accommodates the first and second detecting members, the detecting coils, and holds yokes in a fixed position. The largest outer diameter of the first shaft is smaller than each of the inner diameters of the first detecting member, the second detecting member and the yokes, thereby improving the assembling of the electric power steering apparatus.

20 Claims, 8 Drawing Sheets

ELECTRIC POWER STEERING APPARATUS AND METHOD FOR PRODUCING THE SAME

BACKGROUND OF THE INVENTION

1. Field of the Invention

This invention relates to an electric power steering apparatus that detects steering torque transmitted by a steering shaft by a torque sensor, and provides steering assistance power in response to the torque detected by an electric motor, and a method for producing the same.

2. Description of the Related Art

It is known that there is great demand for enhanced fuel economy in many fields, especially automobiles, from the viewpoint of environmental protection. As a means for achieving this, use of a power steering apparatus powered by an electric motor is being considered, and some electric power steering apparatuses have already been put into practical use.

The electric power steering apparatus is disclosed in, for example, Japan Patent Publication (koukai) No. Heisei 2-132336 (incorporated herein by reference). According to that publication, an input shaft (first shaft) and an output shaft (second shaft) are connected by an elastic member (torsion bar). A first induction member and a second induction member, corresponding to a first detecting member and a second detecting member, are mounted at the end of the input shaft and the output shaft for rotating therewith so that the first induction member and the second induction member are in opposition to one another. The induction members are discs or concentric cylindrical elements made of a conductive material, each member having sector-shaped cut-out portions. The sector-shaped cut-out portions of the two induction members are aligned for a predetermined starting torque. Detecting coils are mounted on both sides of the induction members and generate a high frequency oscillating magnetic field. The magnetic field induces eddy currents in the induction members. The eddy currents in the second induction member increase as the conduction material of the second member is exposed to the detecting coil through the cut-out portions of the first induction member. Increases in the induced eddy currents cause decreases in inductivity of the detecting coil which, when measured, constitute a measure of the transmitted torque. One of the detecting coils is used for detecting torque generated between the input shaft and the output shaft, the other detecting coil is used for temperature compensation. Therefore, it is preferable that at least two detecting coils are provided for the electric power steering apparatus. Each detecting coil is stably fixed to both sides of the induction members, by being fixed to a housing.

In the known electric power steering torque sensor described above, the induction members are mounted at the input shaft and the output shaft and the detecting coils are fixed to the housing so that the induction members are sandwiched between the detecting coils. This design is complicated to assemble. In light of this problem, an electric power steering torque sensor that can be easily installed on the steering column during vehicle assembly is desired.

SUMMARY OF THE INVENTION

According to an embodiment of the present invention an improved electric power steering apparatus is provided. The electric power steering apparatus comprises, a first shaft, a second shaft, an elastic member connected to the first shaft at an end of the elastic member and connected to the second shaft at the other end of the elastic member, an electric motor for generating steering assistance power, the electric motor having an output shaft, a worm shaft connected to the output shaft of the electric motor, a worm wheel provided on the second shaft, the worm wheel meshing with the worm shaft so that the steering assistance power is transmitted from the electric motor to the second shaft, a first detecting member provided to the second shaft, the first detecting member being made of magnetic material, the first detecting member having a plurality of radial notched portions that define a first set of slots, the first set of slots provided on at least one side of the first detecting member so that of the slots are equally space radially about the first detecting member, a pair of second detecting members provided on both sides of the first detecting member so that the first detecting member is sandwiched axially between the two second detecting members, the second detecting member being made of a conductive and non-magnetic material, the second detecting member having a plurality of radial notched portions that define a second set of slots equally spaced radially about the second detecting members, a pair of detecting coils axially disposed on either side of the first detecting member and the second detecting members so that the set of the first detecting member and the second detecting members are sandwiched between the detecting coils, the detecting coils detecting a variation of torque generated between the first shaft and the second shaft, wherein the variation of torque is detected by measuring the variation in impedance in the detecting coils which varies according to the amount of over lap between the first slots and the second slots, a pair of yokes made of magnetic material, each of the yokes accommodating the detecting coil so that the yoke surrounds the detecting coil, a housing accommodating the first detecting member, the second detecting members, the detecting coils, and the yokes, wherein the yokes are fixed to the housing, wherein the largest outer diameter of the first shaft is smaller than each of an inner diameter of the first detecting member, the second detecting member and the yokes.

According to another aspect of the present invention, a method for assembling an electric power steering apparatus is provided. The method of assembling an electric power steering apparatus comprises the steps of connecting a first shaft to an end of an elastic member, connecting a second shaft to the other end of the elastic member, the second shaft having a worm wheel, thereafter assembling an electric motor for generating steering assistance power, the electric motor having an output shaft and a worm shaft connected to the output shaft of the electric motor, the worm wheel meshing with the worm shaft so that steering assistance power is transmitted from the electric motor to the second shaft, installing a torque sensor on the first shaft and the second shaft, wherein the torque sensor comprises, a first detecting member provided on the second shaft, the first detecting member being made of magnetic material and having a plurality of radial notched portions that define first slots, the first slots provided on at least one side of the first detecting member so that the first slots are spaced around the first detecting member, a pair of second detecting members provided on both sides of the first detecting member so that the first detecting member is axially sandwiched between the second detecting members, the second detecting member being made of conductive and non-magnetic material and having a plurality of radial notched portions that defines second slots so the second slots are spaced around the second detecting members, a pair of detecting coils axially provided on both sides of the first detecting member and the second detecting member so that the first detecting member and the second detecting members are sandwiched between the detecting coils, the detecting coils being capable of detecting a variation of torque generated between the first shaft and the second shaft based on a change in impedance of the detecting coils wherein the change in impedance varies according to a variation of an over lap between the first slots and the second slots, a pair of yokes made of magnetic material, each of the yokes accommodating one of the detecting coils so that each yoke surrounds the one of the detecting coil, and thereafter attaching a housing accommodating the first detecting member, the second detecting members, the detecting coils, and the yokes, wherein the yokes are fixed to the housing, wherein the largest outer diameter of the first shaft is smaller than each of inner diameters of the first detecting member, the second detecting member and the yokes.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
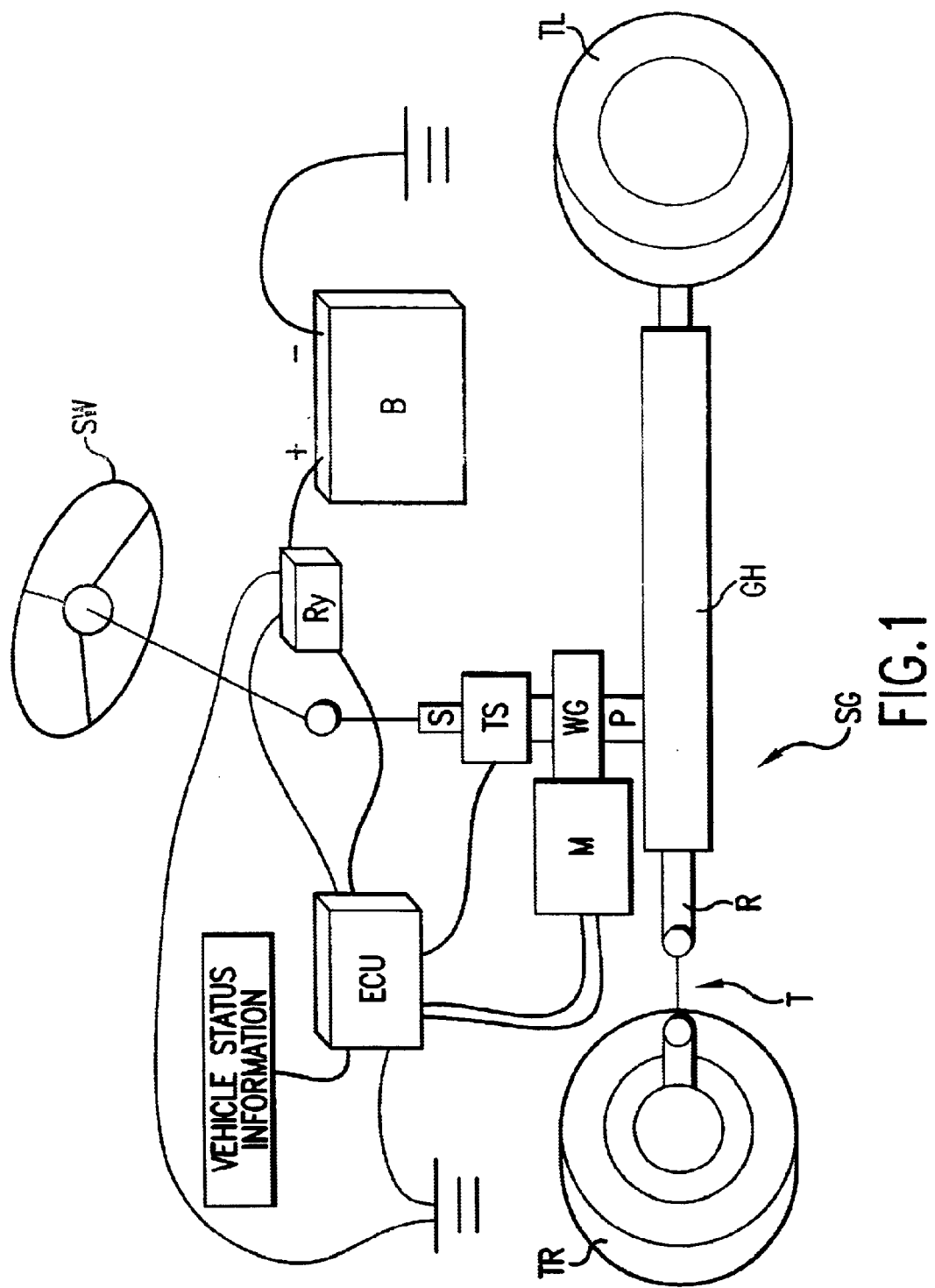
FIG. 1 is a diagrammatic view of an electric power steering apparatus of the present invention.

An electric power steering apparatus according to preferred embodiments will now be described with reference to the drawings. FIG. 1 is a diagrammatic view of an electric power steering apparatus of the present invention. As shown in FIG. 1, a steering wheel SW is connected to one end (the upper end in FIG. 1) of a steering shaft S, and the other end of the steering shaft S (the lower end in FIG. 1) is connected to vehicle wheels TR and TL via a rack-and-pinion type steering gear SG or the like and a tie-rod T. The steering shaft S rotates by operation of the steering wheel SW, and this rotation is transmitted to the steering gear SG which converts the rotation of the steering wheel SW into a rectilinear motion of a rack R. This rectilinear motion is transmitted to the vehicle wheels TR and TL via the tie-rod T. An electric motor M is connected to a pinion P via a worm gear WG. A gear housing GH supports and encloses the rack R and the pinion P therein. The electric motor M generates steering assistance power for manual steering in response to torque transmitted by the steering shaft S. The electric motor M is controlled by an electronic control unit ECU installed in the vehicle. Based on a torque signal sent from torque sensor TS, the electronic control unit ECU sends a control signal to the electric motor M. A battery B supplies electric powers to the electronic control unit ECU, and the electric motor M via a relay Ry. The relay Ry has a protective feature that releases the electric circuit from the battery in the event of a failure.

Figure 2:
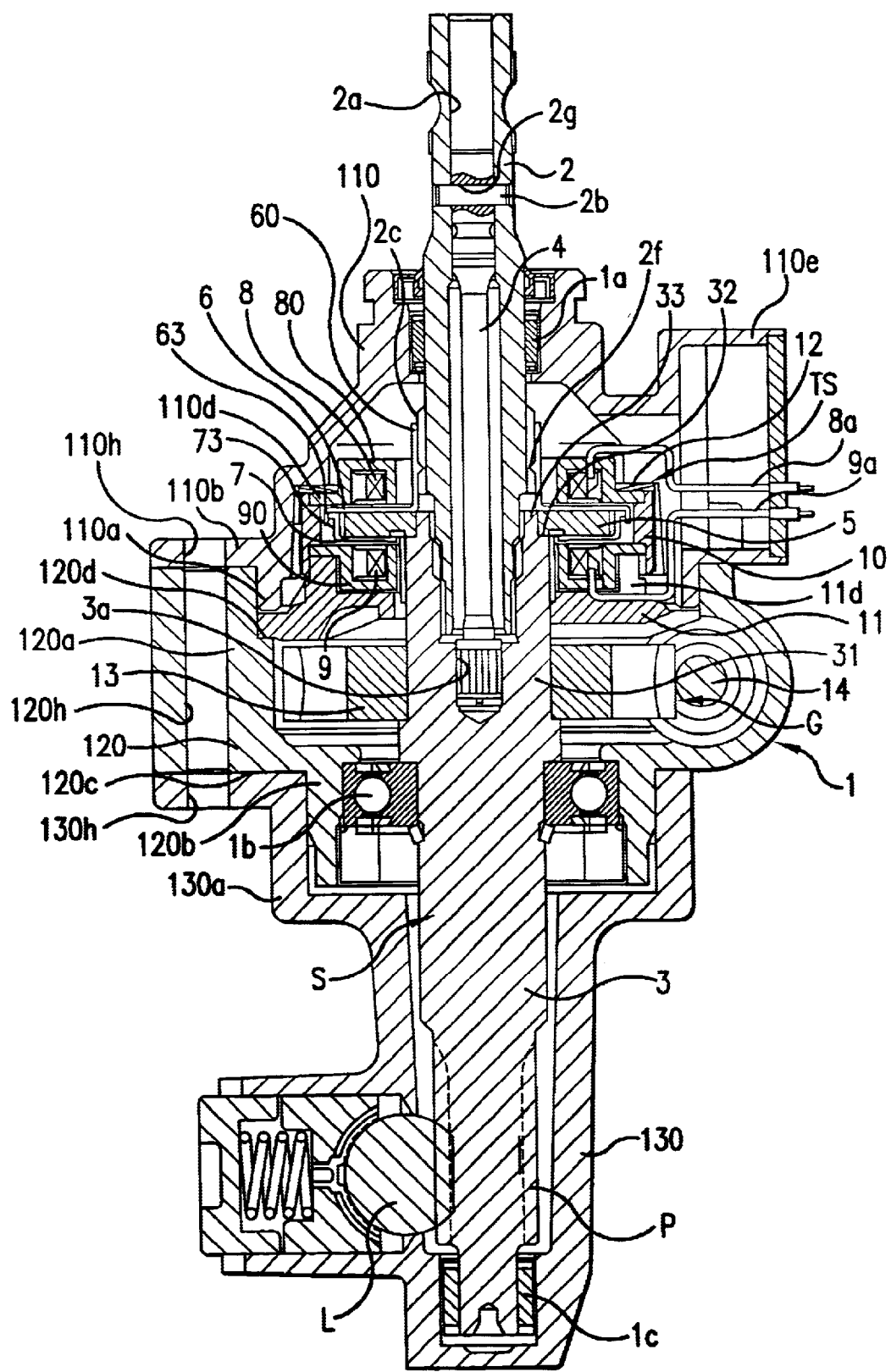
FIG. 2 is a vertical cross sectional view of an electric power steering apparatus of the present invention.
Figure 3:
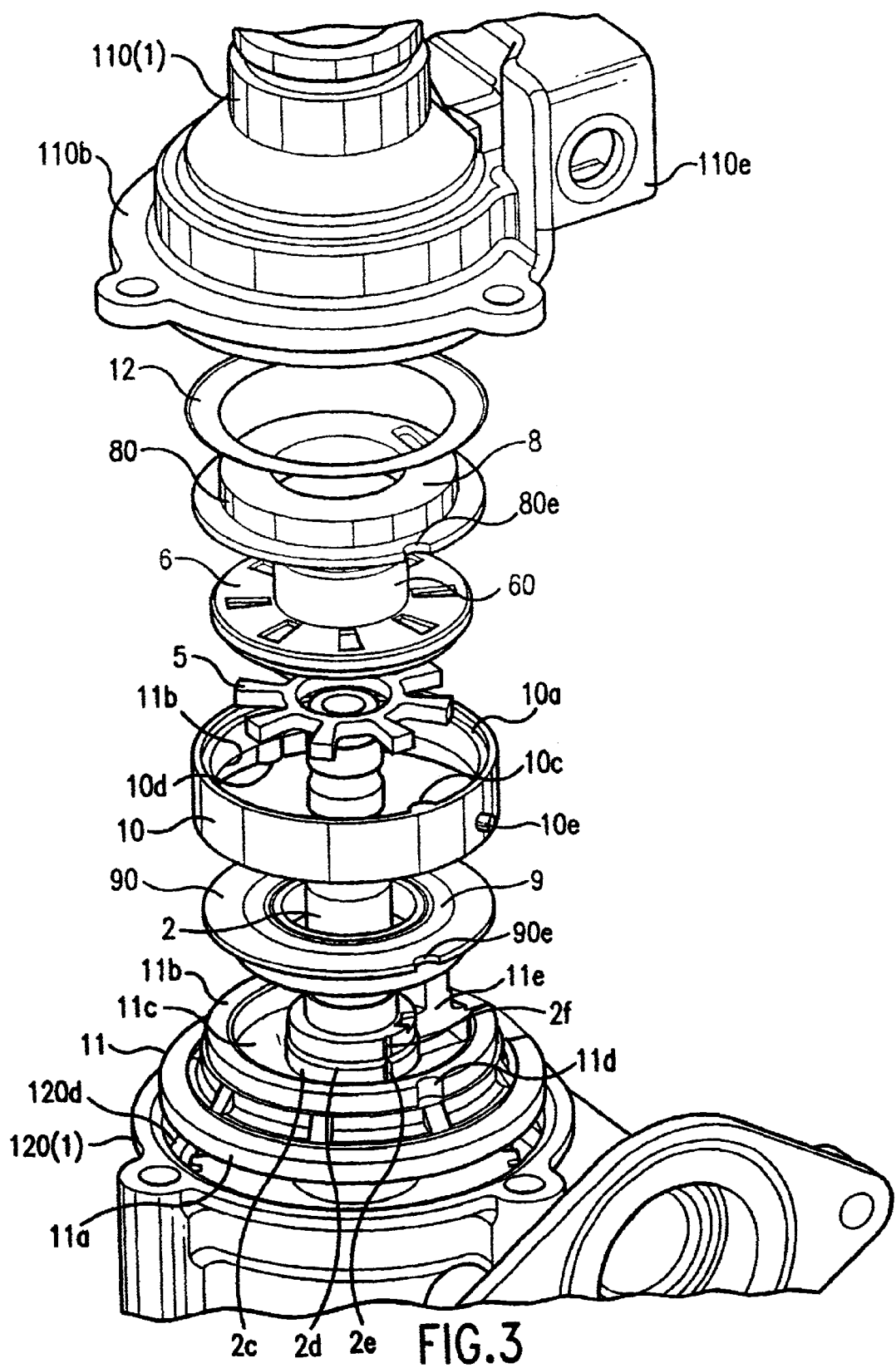
FIG. 3 is an exploded view of the electric power steering apparatus of the present invention.

The structure of the torque sensor TS of the electric power steering apparatus will be described with reference to FIGS. 2 to 9. FIG. 2 is a vertical cross sectional view of the electric power steering apparatus of the present invention; FIG. 3 is an exploded view of the same. In FIGS. 2 and 3, the electric power steering apparatus comprises a housing 1, an input shaft (first shaft) 2, an output shaft (second shaft) 3, a torsion bar (elastic member) 4, a first detecting member 5, a pair of second detecting members 6 and 7, a detecting coil for detecting torque (detecting coil) 8, a detecting coil for temperature compensation (detecting coil) 9, a first spacing member 10, a second spacing member 11, disk spring 12, a worm wheel 13, and a worm shaft 14.

Turning to the housing 1 of the torque sensor TS, the housing 1 is made up of a first housing 110, an intermediate housing 120 and a second housing 130. The first housing 110 mainly supports and encloses the torque sensor TS. The intermediate housing 120 mainly supports and encloses the worm gear WG. The second housing 130 mainly supports and encloses the rack-and-pinion type steering gear R and P. The combined housing 1 also encloses most of the input shaft 2-output shaft 3 assembly.

The intermediate housing 120 has a large inner diameter portion 120a at an upper portion of the inter mediate housing 120. A lower end peripheral portion 110a of the first housing 110 is inserted into the large inner diameter portion 120a of the intermediate housing 120, where a flange portion 110b is supported on a top surface of the intermediate housing 120. The first housing 110 has a portion defining a bolt hole 110h, and the intermediate housing has a portion defining a matching bolt hole 120h. The first housing and the intermediate housing 120 are joined together with one or more bolts (not shown) which are inserted into the bolt holes 110h and 120h.

The second housing 130 has a large outer diameter portion 130a at an upper portion of the second housing. The intermediate housing 120 has a small outer diameter portion 120b at a lower portion of the intermediate housing 120. The small outer diameter portion 120b of the intermediate housing 120 is inserted into the large outer diameter portion 130a of the second housing 130. A stepped portion 120c defined at a lower portion of the intermediate housing 120 is supported on a top surface of the large outer diameter portion 130a of the second housing 130. The second housing 130 has a portion defining a bolt hole 130h. The intermediate housing 120 and the second housing 130 are joined together with one or more bolts (not shown) which are inserted into the bolt holes 120h and 130h. Alternatively, the first housing 110, the intermediate housing 120 and the second housing 130 are joined with a single set of bolts which are inserted into the mutually aligned bolt holes 110h, 120h and 130h. The first housing 110, the intermediate housing 120 and the second housing 130 may be joined by the other suitable fastener means (such as a bond).

The input shaft 2 and the output shaft 3 are axially born by bearings 1a, 1b and 1c which are mounted in the first housing 110, the intermediate housing 120 and the second housing 130, respectively. These bearings permit the input shaft 2 and the output shaft 3 to be rotated in the housing 110, 120 and 130.

The input shaft 2 has an axial opening defining a central hole 2a. The torsion bar 4 is inserted into the central hole 2a. One end of the torsion bar 4 is attached to the input shaft 2 via a pin 2b, and the other end of the torsion bar 4 is attached to an axial opening in the output shaft 3 defining a hole 3a. Lands on the torsion bar 4 engage grooves in the output shaft hole 3a to transmit torque between the torsion bar 4 and the output shaft 3.

The steering wheel SW (not shown in FIG. 2) is connected to the input shaft 2. Rotation torque applied to the steering wheel SW is transmitted in order through the input shaft 2, the torsion bar 4, the output shaft 3, and the rack-and-pinion type steering gear R and P to turn the vehicle wheels TR and TL.

The first detecting member 5 is made of magnetic material such as sintered stainless steel. The first detecting member 5 is a part of a magnetic flux path of the magnetic field generated by the detecting coils 8 and 9. As described in FIG. 5, the first detecting member 5 is fixed to a small diameter portion 33 of the output shaft 3 by press-fitting. In this embodiment, a top surface of a stepped portion 32 of the output shaft 3 does not touch the first detecting member 5.

Figure 4:
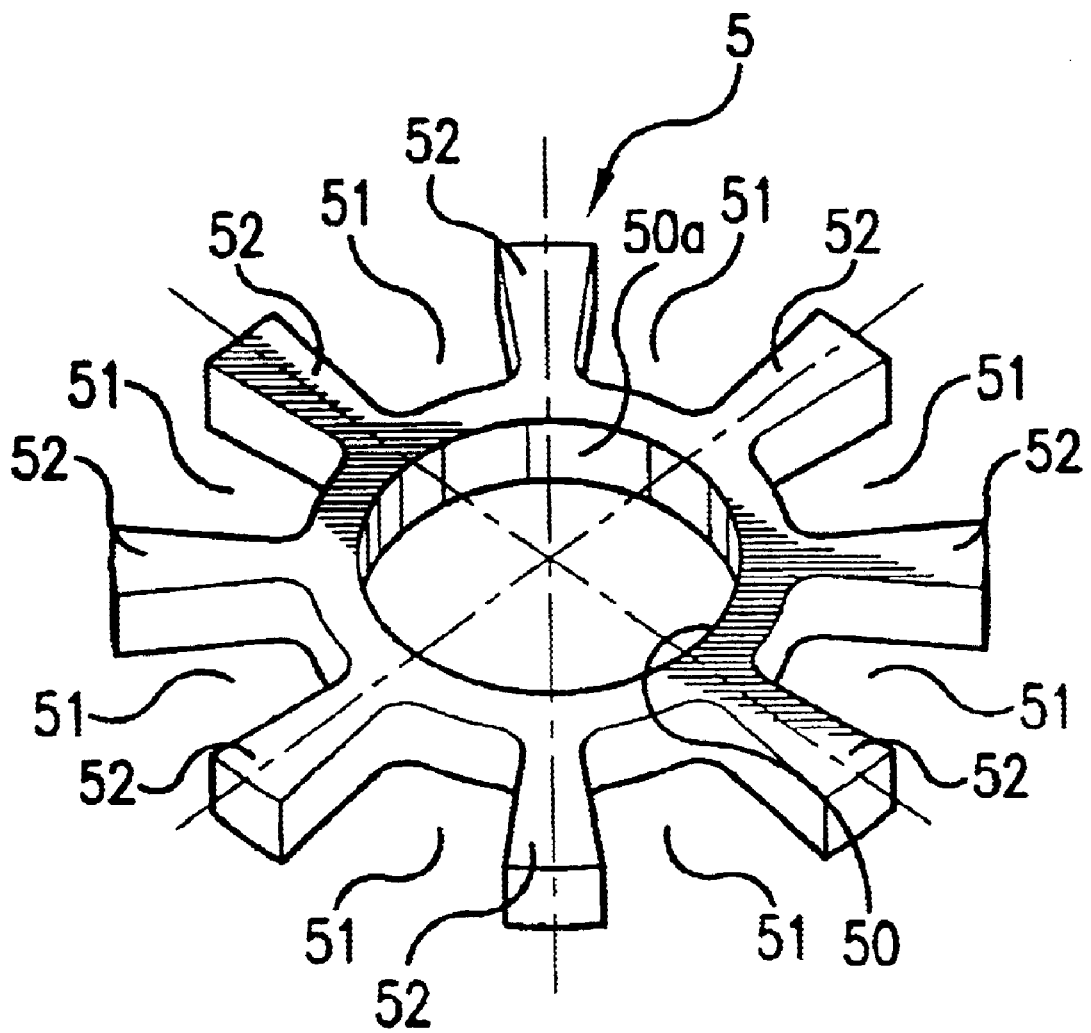
FIG. 4 is an enlarged oblique view of a first detecting member of the electric power steering apparatus of the present invention.

As shown in FIG. 4, the first detecting member 5 has a hub and spoke shape with an axial opening defining a joining hole 50 in a circular bracket portion 53 of the first detecting member 5. Serrations 50a are integrally formed inside of the joining hole 50 when the first detecting member is produced by sintering. The first detecting member 5 and the small diameter portion 33 of the output shaft 3 are tightly joined by a compression fit (e.g. press fitting) aided by the serrations 50a. A plurality of spokes or rods 52 project out radially from around the circular bracket portion 53, defining a plurality of first slots 51 between the rods 52. The rods 52 are uniformly spaced radially about the centerline of the joining hole 50 such that the area of the first slots 51 are all equal to each other.

Figure 5:
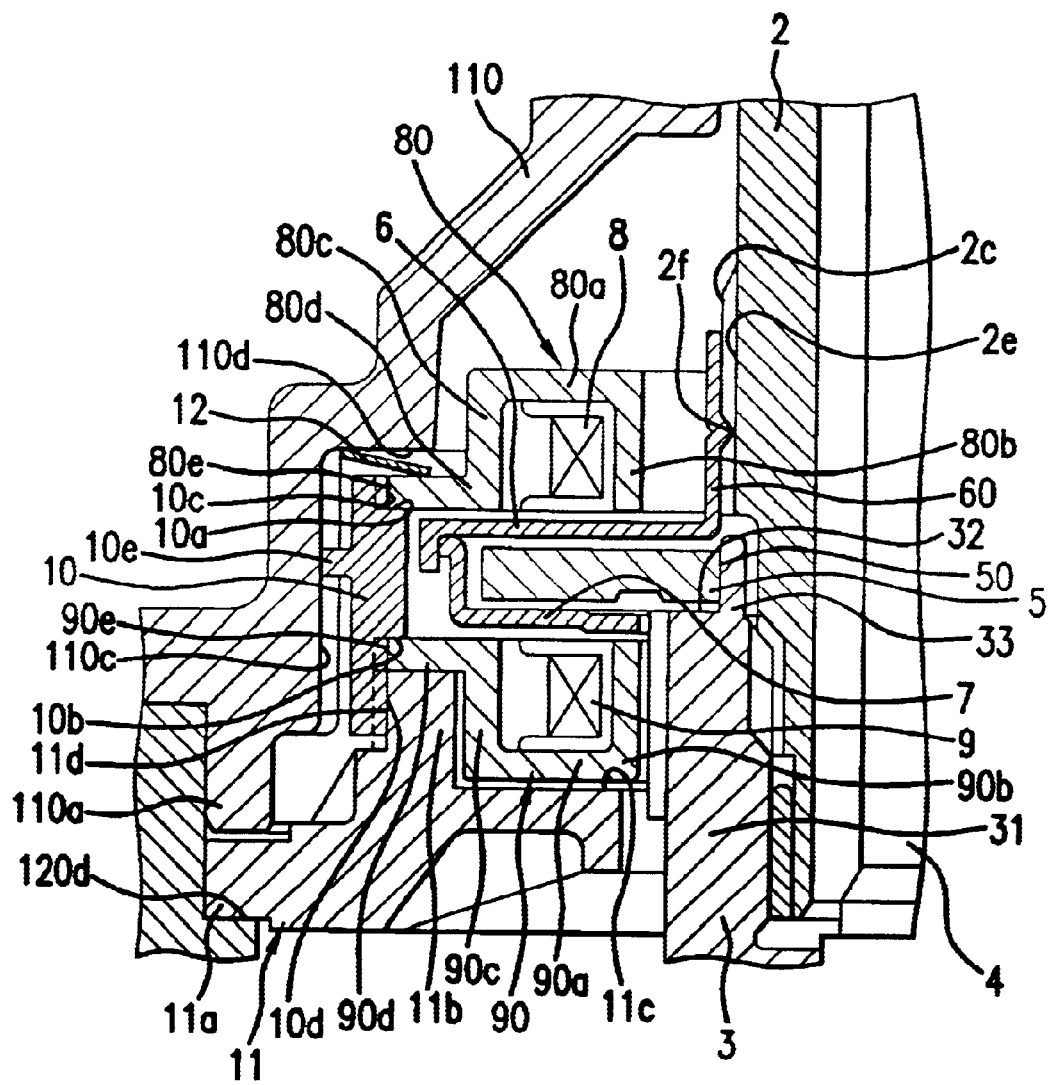
FIG. 5 is an enlarged cross sectional view of various elements of the electric power steering apparatus of the present invention.

The detecting coil 8 detects a difference of torque existing between the input shaft 2 and the output shaft 3 based on a change in impedance of the detecting coil 8. As shown in FIG. 5, the detecting coil 8 faces a top surface of the first detecting member 5. The detecting coil 8 is supported by a yoke 80 that surrounds the side and top surfaces but not the lower surface of the detecting coil 8. The detecting coil 8 is fixed to the housing 1 via the yoke 80. The detecting coil 8 generates a high frequency alternating magnetic field when a high frequency alternating electric current, supplied by the electronic control unit ECU, passes through the coil 8. A magnetic flux path for the magnetic field is formed in the first detecting member 5 and the yoke 80.

As shown in FIG. 5, the yoke 80 comprises a top portion 80a, an inner portion 80b, an outer portion 80c and a flange portion 80d outwardly formed at the lower end of the outer portion 80c. A thickness of the outer portion 80c is thicker than the thickness of the top portion 80a and the inner portion 80b in order to minimize leakage of the magnetic field toward the flange portion 80d.

The detecting coil 9 is used to compensate for errors in the impedance measurement of the detecting coil 8 caused by temperature variations. The detecting coil 9 faces the bottom surface of the first detecting member 5. The detecting coil 9 is supported by a yoke 90 that surrounds the side and bottom surfaces but not the top surface of the detecting coil 9 (see FIG. 5). The detecting coil 9 is fixed to the housing 1 via the yoke 90. The detecting coil 9 generates a high frequency alternating magnetic field when a high frequency alternating electric current, supplied by the electronic control unit ECU, passes through the coil 9. A magnetic path of the magnetic field is formed in the first detecting member 5 and the yoke 90.

As shown in FIG. 5, the yoke 90 comprises a bottom portion 90a, an inner portion 90b, an outer portion 90c and a flange portion 90d outwardly formed at an upper end of the outer portion 90c. A thickness of the outer portion 90c is thicker than the thickness of the bottom portion 90a and the inner portion 90b in order to minimize a leakage of the magnetic field toward the flange portion 90d.

The first spacing member 10 is made of a non-magnetic material. In one embodiment, the first spacing member 10 is made of a synthetic resin (PP S), and has a tube shape. The first spacing member 10 has a pair of first stepped portions 10a and 10b formed inside of the first spacing member 10. The first stepped portion 10a is formed at the upper side of the first spacing member 10 and receives the flange portion 80d of the yoke 80. The first stepped portion 10b is formed at the lower side of the first spacing member 10 and receives the flange portion 90d of the yoke 90. Therefore, the axial distance between the detecting coils 8 and 9 is the same as the axial distance between the first and second stepped portions 10a and 10b. Also, the axial distance between the detecting coils 8 and 9 is adjustable by changing the axial distance between the first and second stepped portions 10a and 10b. Also, the outer diameter of the yoke flange portion 80d and an inner diameter of an upper portion of the first spacing member 10 are approximately the same. Therefore, there is no radial clearance play between the first spacing member 10 and the yoke 80. An inner diameter of a small diameter portion of the first spacing member 10 defined between the stepped portions 10a and 10b is smaller than the inner diameters of the first spacing member 10 defined at the stepped portions 10a and 10b, and is larger than the outer diameters of the first detecting member 5 and the second detecting members 6 and 7. Therefore, the first and second detecting members 5, 6 and 7 are capable of rotating within the first spacing member 10.

The first spacing member 10 has a pair of axial projections 10c and 10d. The axial projections 10c and 10d are formed inside of the first spacing member 10. These axial projections 10c and 10d fit into complimentary axial notches 80e and 90e, respectively, in the flange portions 80d and 90d. The axial projections 10c and 10d and the axial notches 80e and 90e comprises a first locking member. The axial projections 10c and 10d and the axial notches 80e and 90e are positioned so that, when assembled a pair of harness 8a and 9a of the detecting coils 8 and 9 are axially aligned with respect to each other, and are fixed therein. Alternatively, in an equivalent embodiment of the first locking member, the axial projections 10c and 10d may be formed on the flange portions 80d and 90d and the complimentary axial notches 80e and 90e may be defined inside of the first spacing member 10.

The second spacing member 11 has a lower flange portion 11a. The lower flange portion 11a is received on a stepped portion 120d formed inside of the large inner diameter portion 120a of the intermediate housing 120. The lower flange portion 11a is sandwiched between the lower end peripheral portion 110a of the first housing 110 and the second stepped portion 120d. Therefore, the second spacing member 11 is tightly fixed to the housing 1. An upper tubular portion 11b is formed on the lower flange portion 11a. The upper tubular portion 11b has an axial opening defining a circular hole 11c. The yoke 90 is received in the circular hole 11c. The upper tubular portion 11b is inserted into the first spacing member 10. A top surface of the upper tubular portion 11b is received on the first stepped portion 10b via the flange portion 90d of the yoke 10. Therefore, axial relative positions of the detecting coils 8 and 9 with regard to the first housing 110 are adjustable by changing the height of the upper tubular portion 11b. Also, outer diameters of the flange portion 90d and the upper tubular portion 11b and an inner diameter of a lower portion of the first spacing member 10 are approximately the same. Therefore, there is no radial clearance play among the first spacing member 10, the yoke 90 and the second spacing member 11. In addition, the second spacing member 11 has a portion defining an axial notch 11e (shown in FIG. 3). The axial notch 11e is provided in order to pass the electrical wiring harness 9a out.

The upper tubular portion 11b has a portion defining an axial notch 11d that is complimentary to and provided for receiving the axial projection 10d in the first spacing member 10. The axial notch 11d and the axial projection 10d are positioned so that, when assembled the harness 9a faces the axial notch 11e. Alternatively, in an equivalent embodiment of the first locking member, the axial projection 10d may be formed on the upper tubular portion 10b and the complimentary axial notch 11d may be defined inside of the first spacing member 10.

The first spacing member 10 has an axial projection 10e on the outer surface of the first spacing member 10. The first housing 110 has a portion defining a complimentary axial notch 110c provided for receiving the axial projection 10e. The first housing 110 has a board housing 110e (in FIG. 3) accommodating a circuit board (not shown). The axial projection 10e and the axial notch 110c are positioned so that when assembled, the harnesses 8a and 9a face the board housing 110e. The axial projection 10e and the axial notch 110c comprise a second locking member. Alternatively, in an equivalent embodiment of the second locking member, the axial projection 10e may be formed inside of the first housing 110 and the complimentary axial notch 110c may be defined on the outer surface of the first spacing member 10.

The disk spring 12 is provided between a stepped portion 110d of the first housing 110 and the flange portion 80d of the yoke 80. The disk spring 12 presses against the flange portion 80d and against the stepped portion 110d. Also, the first housing 110 and the intermediate housing 120 are joined with bolts. As a result, the yokes 80 and 90 and the detecting coils 8 and 9 are tightly joined to each other. This maintains the axial relative positions between the yokes 80 and 90 and the detecting coils 8 and 9.

Figure 6:
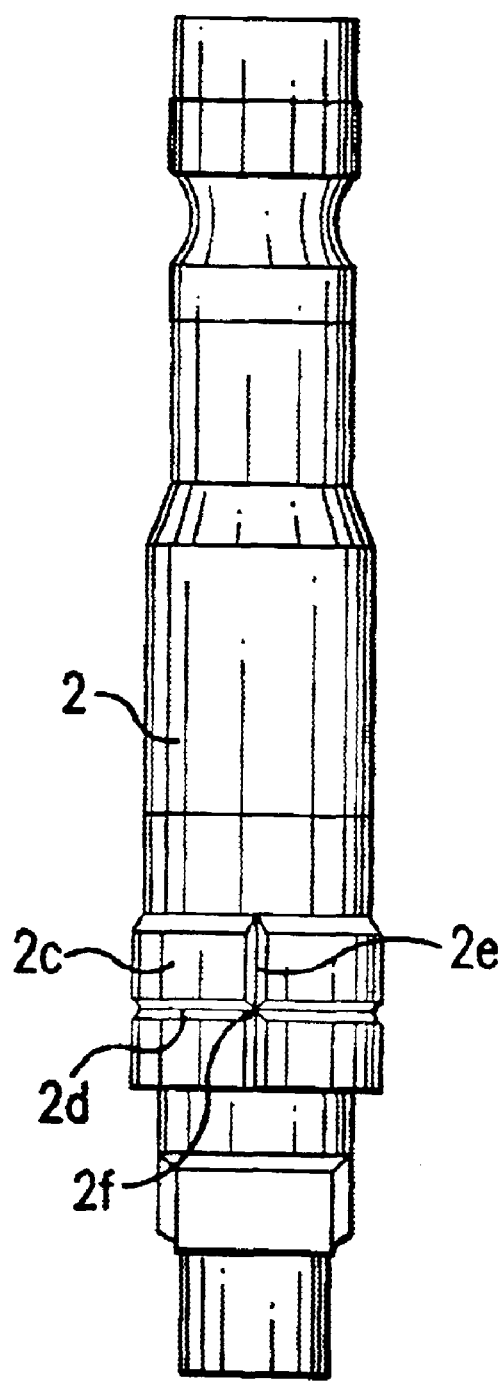
FIG. 6 is a front view of an input shaft (first shaft) for the electric power steering apparatus of the present invention.
Figure 8:
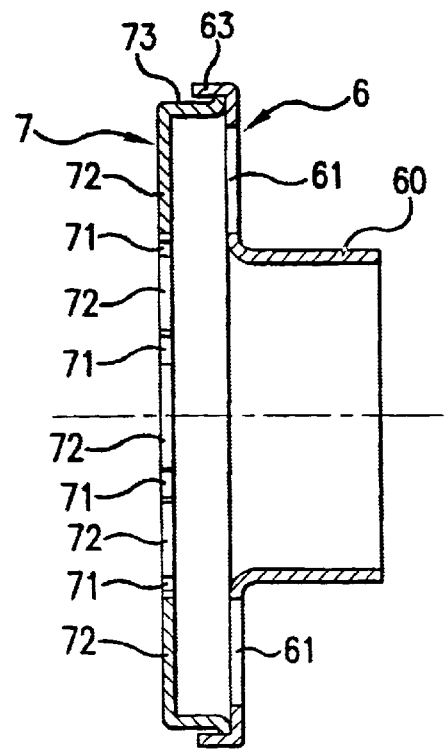
FIG. 8 is a vertical cross sectional view of the second detecting member taken on line VIII—VIII of FIG. 2.
Figure 9:
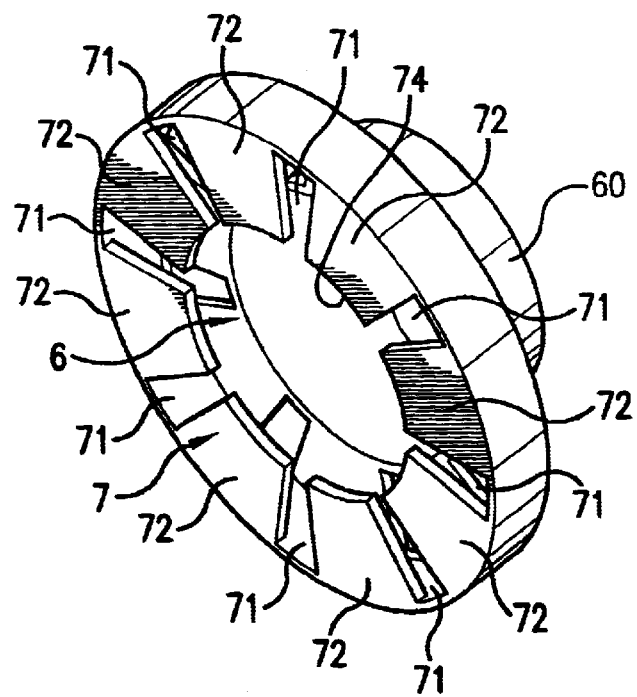
FIG. 9 is an oblique view of the second detecting member for the electric power steering apparatus of the present invention.

As shown in FIG. 6, the input shaft 2 has a large diameter portion 2c formed at the lower side of the input shaft 2. The large diameter portion 2c has portions defining a plurality of axial notches 2e and has a portion defining an annular notch 2d on the outer surface thereof. At the point of intersection of the axial notch 2e and the annular notch 2d, there is a portion defining a hollow 2f. On the other hand, as shown in FIGS. 8 and 9, a second detecting member 6 comprises a tubular bracket portion 60, a plurality of shield portions 62 and an outer tubular portion 63. The shield portions 62 are also described herein and in the claims as a first flange portion. The tubular portion 63 is also described herein and in the claims as a tubular member. The input shaft 2 and the second detecting member 6 are swaged together at the hollow 2f by a swaging tool so that the tubular bracket portion 60 is engaged into the hollow 2f. When swaged, the second detecting member 6 is held at a fixed position, axially and radially, on the input shaft 2.

The first detecting member 5 and the second detecting member 6 are separated by a predetermined clearance. As described in FIGS. 7, 8 and 9, the second detecting member 6 has a plurality of shield portions 62. A plurality of second slots 61 are defined between the shield portions 62. The number of the second slots 61 is the same as the number of the rods 52 of the first detecting member 5; there are eight second slots 61 in this embodiment. In addition, the radial width of the rod 52 and the radial width of the second slot 61 may be the same.

The second detecting member 6 is made of conductive and non-magnetic material, such as aluminum. A change in impedance within the detecting coil 8 is induced by variations of the over lap between the first slots 51 and the second slots 61.

The second detecting member 7 is provided between the first detecting member 5 and the detecting coil 9. The second detecting member 7 has an outer tubular portion 73 at the outer peripheral portion of the second detecting member 7. The second detecting members 6 and 7 are connected together at the outer tubular portions 63 and 73 so that the second detecting member 7 rotates together with the second detecting member 6. An inner peripheral portion of the second detecting member 7 does not touch the output shaft 3. The second detecting member 7 has a plurality of shield portions 72. A plurality of second slots 71 are defined between the shield portions 72. The number of the second slots 71 is the same as the number of the rods 52 of the first detecting member 5; there are eight slots 71 in this embodiment. In addition, the radial width of the rods 52 and a radial width of the second slots 71 may be the same.

Figure 7:
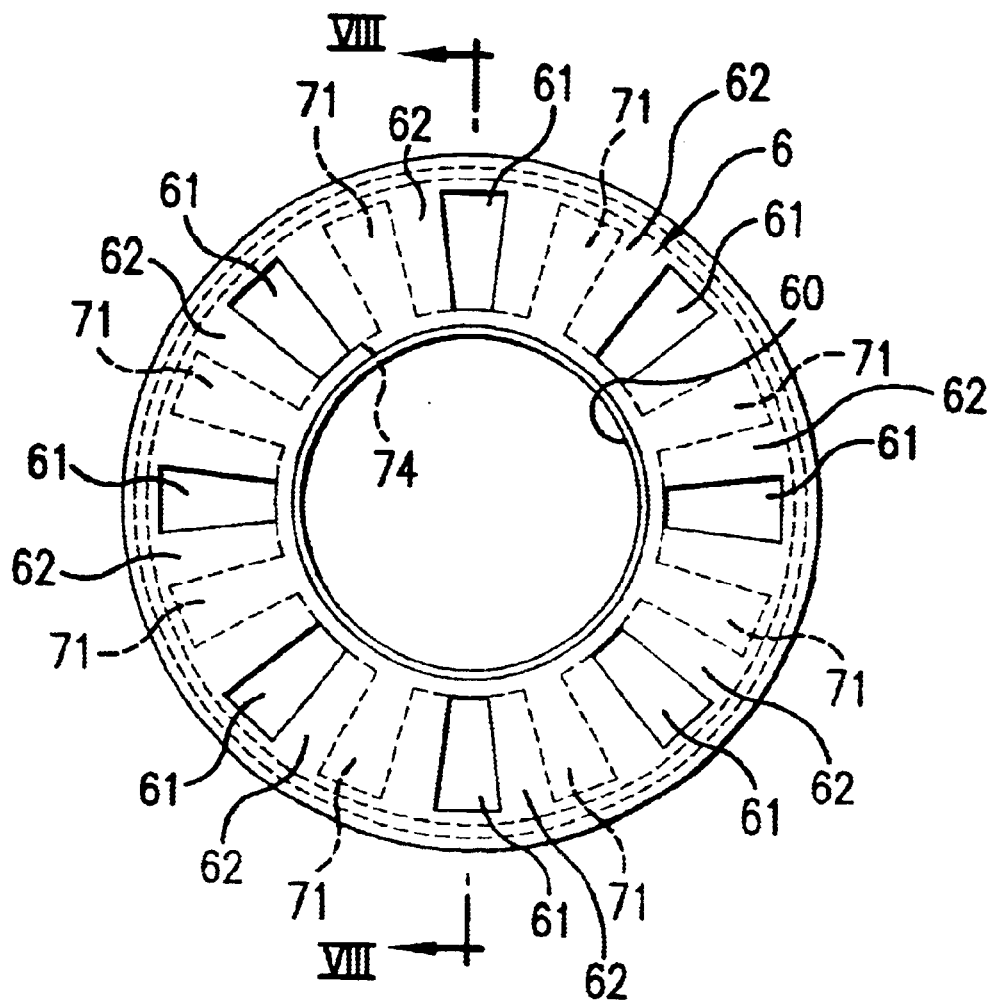
FIG. 7 is a top view of a second detecting member for the electric power steering apparatus.

As shown in FIG. 7, in one embodiment, the second slot 61 of the second detecting member 6 and the second slot 71 of the second detecting member 7 are displaced 22.5 degrees with respect to each other. In addition, the radial width of the shield portion 62 and the radial width of the shield portion 72 may be the same. In a starting position, in other words, when torque is not produced in the steering shaft S, the rods 52 are positioned so that the rods 52 completely over lap with both the shield portions 62 and 72. In this position, since the rods 52 are positioned between the second slots 61 and 71, the rods 52 do not over lap the second slot 61 nor the second slot 71.

As shown in FIG. 9, the second detecting member 7 has an axial opening defining a hole 74 at the center of the second detecting member 7. The hole 74 connects to the second slots 71. Therefore, the second detecting member 7 permits axially inserting the first detecting member between the second detecting members 6 and 7 from the lower side of the second detecting member 7. The outer diameter of the input shaft large diameter portion 2c, which is the largest outer diameter of the input shaft 2, is smaller than the inner diameter of the tubular bracket portion 60 of the second detecting member 6, the inner diameter of the joining hole 50 of the first detecting member 5, and the inner diameters of the yokes 80 and 90 accommodating the detecting coils 8 and 9. Therefore, these members (the second detecting member 6, the first detecting member 5, the yokes 80 and 90, and the detecting coils 8 and 9) can be assembled on the input shaft 2 and the output shaft 3 from the input shaft 2 end after the input shaft 2 and the output shaft 3 have been joined together via the torsion bar 4.

A procedure for assembling each of the members of the electric power steering apparatus comprises the following steps.

(i) The bearing 1*b* is fixed to the output shaft 3 by press fitting.

(ii) In this assembled state, the output shaft 3 is inserted into the intermediate housing 120 from the lower side of the intermediate housing 120 (see FIG. 2). At the same time, the bearing 1*b* is fixed to the small outer diameter portion 120*b* of the intermediate housing 120 by press fitting. Therefore, the output shaft 3 and the intermediate housing 120 are capable of rotating with respect to each other.

(iii) Next, the torsion bar 4 is inserted into the hole 3*a* of the output shaft 3. As shown in FIG. 2, the torsion bar 4 has a spline surface on its lower portion. The spline surface meshes a corresponding inside surface of the hole 3*a*. As a result, the torsion, bar 4 and the output shaft 3 are tightly joined together.

(iv) Next, the torsion bar 4 is inserted into the central hole 2*a* of the input shaft 2 until the input shaft 2 is completely inserted into the output shaft 3. In this state, a hole 2*g* is drilled into the input shaft 2 and the torsion bar 4 through a diameter of the input shaft 2.

(v) Next, the input shaft 2 and the torsion bar 4 are tightly joined together via the pin 2*b* placed in the hole 2*g*. At this time, any cutting lubricants or chippings adhering to the input shaft 2 or the output shaft 3 from the drilling of the hole 2*g* are removed.

(vi) The small outer diameter portion 120*b* of the intermediate housing 120 is inserted into the large outer diameter portion 130*a* of the second housing 130. At the same time, the pinion P is caused to mesh with the rack R by rotating the pinion P until the lands and grooves align.

(vii) Then, a lower end portion of the output shaft 3 is inserted into the bearing 1*c* fixed to the second housing 130 by press fitting. As a result, the output shaft 3 is capable of rotating within the second housing 130 by means of the bearing 1*c*.

(viii) The worm wheel 13 is fixed to the output shaft 3 by press fitting it into the intermediate housing 120.

(ix) The lower flange portion 11*a* of the second spacing member 11 is placed on the second stepped portion 120*d* of the intermediate housing 120.

(x) The detecting coil 9 is inserted into the yoke 90, and then the yoke 90 is inserted into the circular hole 11*c* of the second spacing member 11 so that the flange portion 90*d* is seated on the upper tubular portion 11*b*.

(xi) The first detecting member 5 is fixed to the small diameter portion 33 of the output shaft 3 by press fitting. At this time, the first detecting member is axially positioned whereby a measuring sensor measures the space between the first detecting member 5 and the detecting coil 9.

(xii) The second detecting members 6 and 7 connected at the outer tubular portions 63 and 73 together are fixed to the large diameter portion 2*c* of the input shaft 2 by swaging. As described above, the first detecting member 5 is capable of being inserting through the hole 74 and the second slots 71 of the second detecting member 7. Therefore, the second detecting members 6 and 7 are lowered onto the input shaft 2 and assembled into final position after the first detecting member 5 has been fixed on the output shaft 3. When the second detecting member 7 is positioned, the axial position of the second detecting member 7 is measured by a measuring sensor to establish a predetermined spacing between the second detecting member 7 and the detecting coil 9. At the same time, the second detecting member 7 is radially positioned so that the rod 53 completely over laps with both the shield portions 62 and 72. In other words, the shield portions 62 and 72 completely shield the magnetic field generated between the detecting coils 8 and 9 and the first detecting member 5. The difference of the value of the inductivities between the detecting coils 8 and 9 is 0 (zero) in this position.

(xiii) After being positioned, the input shaft 2 and the second detecting member 6 are swaged together at the hollow 2*f* by a swaging tool so that the tubular bracket portion 60 is engaged into the hollow 2*f* on the input shaft 2.

(xiv) The first spacing member 10 is positioned on the yoke 90 so that the top surface of the flange portion 90*d* is received on the first stepped portion 10*b*. At this time, the axial notch 90*e* of the flange portion 90*d* and the axial notch 11*d* of the second spacing member 11 receive the axial projection 10*d* of the first spacing member 10. The harness 9*a* faces the axial notch 11*e* by virtue of the positions of axial notches 90*e* and 11*d* and the axial projection 10*d*.

(xv) The detecting coil 8 is inserted into the yoke 80, and then the yoke 80 is inserted into the first spacing member 10 so that the flange portion 80*d* is received on the first stepped portion 10*a*. At this time, the axial notch 80*e* of the flange portion 80*d* receives the axial projection 10*c* of the first spacing member 10. The harnesses 8*a* and 9*a* are aligned with each other by virtue of the positions of the axial notch 80*e* and the axial projection 10*c*. Electric leads from the detecting coils 8 and 9 are drown out through the axial notch 11. In addition, the spacing between the yoke 80 (the detecting coil 8) and the yoke 90 (the detecting coil 9) is properly maintained by virtue of the spacing between the first stepped portions 10*a* and 10*b*. In this configuration, the small diameter portion 33 of the output shaft 3 is not covered by the intermediate housing 120. In other words, when the torque sensor TS (i.e., the detecting coils 8 and 9 and the first and second detecting members 5, 6 and 7 etc.) is in position on the input shaft 2*a* and the output shaft 3, a gap remains where the torque sensor TS is positioned. This improves assembly of the torque sensor TS.

(xvi) The disc spring 12 is positioned on the flange portion 80*d*.

(xvii) Then, the first housing 110 is positioned so that the disc spring 12 is compressed between the stepped portion 110*d* of the first housing 110 and the flange portion 80*d* of the yoke 80. At the same time, the input shaft 2 is inserted into the bearing 1*a* fixed to the first housing 110 by press fitting. So positioned, the input shaft 2 is capable of rotating within the first housing 110 by means of the bearing 1*a*. The lower end peripheral portion 110*a* of the first housing 110 is inserted into the large inner diameter portion 120*a* of the intermediate housing 120. The flange portion 110*b* is received on the top surface of the large inner diameter portion 120*a*. So assembled, the yoke 80, the first spacing member 10, the yoke 90 and the second spacing member 11 are tightly joined to each other between the disc spring 12 and the second stepped portion 120*d*. The axial notch 110*c* of the first housing 110 receives the axial projection 10*e* on the first spacing member 10. The axial notch 110*c* and the axial projection 10*e* result in the harness 8a and 9a facing the board housing 110e of the first housing 110. In this state, the first housing 110 and the intermediate housing 120 are joined with bolts. Alternatively, the first housing 110, the intermediate housing 120 and the second housing 130 may be joined by a single set of bolts inserted through holes 110h, 120h and 130h.

(xviii) Finally, the electric motor M is positioned so that the worm shaft 14 is caused to mesh with the worm wheel 13 by rotating the worm shaft 14. The electric motor M and the intermediate housing 120 are joined with bolts (not shown).

Next, operation of the electric power steering apparatus will be described. When the torque sensor TS described above is in the starting position, that is when there is no torque produced in the steering shaft S, the shield portions 62 and 72 completely shield the magnetic field generated between the detecting coils 8 and 9 and the first detecting member 5. Therefore, the difference of the value of the inductivities between the detecting coils 8 and 9 is 0 (zero).

When the input shaft 2 is subjected to a torque by turning the steering wheel SW, the torsion bar 4 twists with increasing torque as the torque is transmitted to the output shaft 3. As the torque increases, the rods 52 of the first detecting member 5 extend more and more into the second slots 61 of the second detecting member 6. This causes eddy currents to be generated in the rods 52 which, in turn, changes the impedance of the detecting coil 8. Conversely, as the torque increases, the rods 52 extend more and more into the shield portion 72 of the second detecting member 7. This causes eddy currents generated in the rods 52 to be reduced which, in turn, changes the impedance of the detecting coil 9. Thus, an increase in applied torque in one direction causes the impedance of the detecting coil 8 to increase and, simultaneously, causes the impedance of the detecting coil 9 to decrease.

The difference between the value of the impedance of the detecting coil 8 and the value of the impedance of the detecting coil 9 is calculated by the electric control unit ECU. The difference in impedance is used to calculate the value of the electric current provided to the electric motor M. The difference value is compensated for errors in the detecting coil 8 impedance caused by variations of the temperature. In addition, the difference value is approximately twice the single impedance value of the detecting coil 8 or 9. Consequently, the accuracy of torque detected by the detecting coils 8 and 9 is increased.

Advantages of the electric power steering apparatus of this embodiment will be described. The outer diameter of the large diameter portion 2c of the input shaft 2 is smaller than the inner diameter of the tubular bracket portion 60 of the second detecting member 6, the inner diameter of the joining hole 50 of the first detecting member 5, and the inner diameters of the yokes 80 and 90 accommodating the detecting coils 8 and 9. Consequently, these members (the second detecting member 6, the first detecting member 5, the yokes 80 and 90, and the detecting coils 8 and 9) can be assembled on the input shaft 2 and the output shaft 3 from the input shaft 2 end after the input shaft 2 and the output shaft 3 have been joined together via the torsion bar 4. This improves the assembly of the electric power steering apparatus because the drilling and pinning assembly step can be completed, and drilling lubricants and shavings cleaned up, before the sensitive electronic torque sensor components are installed. Also, the second detecting members 6 and 7 are fixed to the input shaft 2 together, thereby simplifying this assembly step.

Because the second detecting member 7 has the hole 74 connected to the second slots 71, the second detecting member 7 permits axially inserting the first detecting member between the second detecting member 6 and 7 from the lower side of the second detecting member 7. As a result, after the first detecting member 5 is fixed to the output shaft 3, the second detecting members 6 and 7 connected via the outer tubular portions 63 and 73 can be inserted onto the input shaft 2, after which, the second detecting members 6 and 7 are fixed to the input shaft 2 so that the first detecting member 5 is sandwiched between the second detecting members 6 and 7. This improves the assembly of the second detecting members 6 and 7.

The input shaft 2 and the second detecting member 6 are swaged together at the hollow 2f by a swaging tool so that the tubular bracket portion 60 is engaged into the hollow 2f. This improves workability of making fine adjustments of the spacing between the second detecting coil 8 and the second detecting member 6, and the spacing between the second detecting coil 9 and the second detecting member 7. Because the second detecting member 6 and the input shaft 2 are joined together after adjustments, an axial displacement between the input shaft 2 and the second detecting members 6 and 7 and a radial displacement between the first detecting member 5 and the second detecting members 6 and 7 are prevented.

The first spacing member 10 determines the axial spacing between the detecting coils 8 and 9 by being assembled between the yokes 80 and 90. This improves fabricability by controlling the spacing between the yokes 80 and 90 (the detecting coils 8 and 9). Fixing the yoke 80 to the first housing 110 is unnecessary because the yoke 80 is received on the first stepped portion 10a of the first spacing member 10. Accordingly, all of the members of the torque sensor TS can be installed before installing the first housing 110.

As described above, it is preferable to install the torque sensor TS onto the input shaft 2 and the output shaft 3 after the input shaft 2 and the output shaft 3 are joined together. This is because cutting lubricant and chippings generated by drilling the hole 2g can be cleaned up before the sensitive torque sensor TS is positioned onto the input shaft 2. If the torque sensor TS is installed before joining the input shaft 2 and the output shaft 3, the torque sensor TS may become dirty with the cutting lubricant or the chippings. Thus, the electric power steering assembly of this embodiment, which permits the input shaft 2 and the output shaft 3 to be joined together before providing the torque sensor TS, prevents cutting lubricant or chippings by the drilling of the hole 2g from adhering to the torque sensor TS.

The axial notches 80e and 90e and the axial projections 10c and 10d are provided between the yokes 80 and 90 and the first spacing member 10 which ensures the harnesses 8a and 9a are aligned to each other. Additionally, the axial projection 10d and axial notch 11d are provided between the first spacing member 10 and the second spacing member 11, which ensures that the harness 9a faces the axial notch 11e of the second spacing member 11. Furthermore, the axial projection 10e and the axial notch 110 are provided between the first spacing member 10 and the first housing 110, which ensures the harness 8a and 9a face the board housing 110e of the first housing 110. These notches and projections improve the assembly of the electric power steering apparatus.

The yokes 80 and 90 are fixed to the housing 1 by means of the flange portions 80d and the 90d of the yokes 80 and 90 which are respectively received on the first stepped portions 10a and 10b. The flange portions 80d and 90d project from the outer portions 80c and 90c. Fixing the yokes 80 and 90 within the housing 1 by compressing only the flange portion 80d and 90d minimizes the compression stress throughout the remaining portions of the yokes 80 and 90. Consequently the top portions 80a and 90a, the inner portions 80b and 90b and the outer portions 80c and 90c do not have a varying internal stresses field. This lack of an internal stress gradient improves the magnetic qualities of the yokes 80 and 90 in the portions important to directing the magnetic field generated by the coils 8 and 9. Therefore, even though, the flange portions 80d and 90d are pinched between the disc spring 12 and the first stepped portion 10a and the between the first stepped portion 10b and the upper tubular portion 11b of the second spacing member 11, internal stress of the top portions 80a and 90a, the inner portions 80b and 90b and the outer portions 80c and 90c do not change. Accordingly, an improved accuracy of the detecting torque is obtained.

The yokes 80 and 90 are fixed so that the first spacing member 10 is positioned between the flange portions 80d and 90d, and pressed between the disc spring 12 and the second spacing member 11. Accordingly, the yokes 80 and 90 are fixed to the housing 1 whereby only the disc spring 12 is provided between the flange portion 80d and the stepped portion 110d of the first housing 110 without changing the internal stress of the portions 80a, b, and c and 90a, b, and c of the yokes 80 and 90. The disc spring 12 prevents a displacement of the yokes 80 and 90, and thus the detecting coils 8 and 9.

The yokes 80 and 90 are fixed to the housing 1 via the second spacing member 11 so that the first spacing member 10 is sandwiched between the yokes 80 and 90. Accordingly, the axial positions of the second detecting members 6 and 7 and the yokes 80 and 90 (the detecting coils 8 and 9) with regard to the first detecting member 5 can be adjusted by changing the design of the second spacing member 11 without changing the design of the housing 1.

While the present invention is described on the basis of certain a preferred embodiment, it is not limited thereto, but is defined by the appended claims as interpreted in accordance with applicable law. For example, according to the previously described preferred embodiments of the present invention, although the input shaft 2 and the output shaft are joined via the pin 2b after the output shaft 3 is fixed to the intermediate housing 120, the input shaft 2 and the output shaft 3 may be joined together before the output shaft 3 is fixed to the intermediate housing 120. This would prevent cutting lubricant or chippings by the drilling of the hole 2g from adhering to the intermediate housing 120. Also, the housing 1 may be separated into two pieces or four or more pieces. Also, although the second detecting members 6 and 7 are connected together, the second detecting member may be formed from one piece.

This application relates to and incorporates herein by reference in its entirety Japanese Patent application No. 2001-383568, filed on Dec. 17, 2001, from which priority is claimed.

What is claimed is:

1. An electric power steering apparatus comprising:
   a first shaft;
   a second shaft;
   an elastic member having a first end and a second end, the first end of the elastic member connected to the first shaft and the second end of the elastic member connected to the second shaft;
   an electric motor for generating steering assistance power, the electric motor having an output shaft;
   a worm shaft connected to the output shaft of the electric motor;
   a worm wheel provided on the second shaft, the worm wheel meshing with the worm shaft so that steering assistance power is transmitted from the electric motor to the second shaft;
   a first detecting member provided on the second shaft, the first detecting member being made of magnetic material and having a plurality of radial notched portions defining first slots, the first slots provided on at least one side of the first detecting member so that the first slots are spaced around the first detecting member;
   a pair of second detecting members provided on both sides of the first detecting member so that the first detecting member is axially sandwiched between the second detecting members, the second detecting members being made of conductive and non-magnetic material and having a plurality of radial notched portions defining second slots so the second slots are spaced around the second detecting members, the second detecting members being coupled to the first shaft;
   a pair of detecting coils axially provided on both sides the first detecting member and the second detecting members so that the set of the first detecting member and the second detecting members are sandwiched between the detecting coils, the detecting coils capable of detecting a variation of torque generating between the first shaft and the second shaft based on a change in impedance of the detecting coils wherein the change in impedance is due to a variation of an over lap between the first slots and the second slots;
   a pair of yokes made of magnetic material, each of the yokes accommodating one of the detecting coils so that each yoke partially surrounds the one of the detecting coils; and
   a housing accommodating the first detecting member, the second detecting members, the detecting coils, and the yokes;
   wherein the yokes are fixed to the housing, and
   wherein the largest outer diameter of the first shaft is smaller than each of inner diameters of the first detecting member, the second detecting member and the yokes.

2. An electric power steering apparatus according to claim 1, wherein the second detecting members are connected to each other and permit inserting the first detecting member between the second detecting members from one side of the second detecting members.

3. An electric power steering apparatus according to claim 2, wherein:
   the first detecting member comprises a circular bracket portion connected to the second shaft and a plurality of rods radially connected to the circular bracket portion, and the detecting coils generate a magnetic field, and wherein:
   one of the second detecting members comprises a tubular bracket portion connected to the first shaft and a first flange portion connected to an end of the tubular bracket portion,
   the other of the second detecting members comprises a second flange portion,
   a tubular member connects to an outer peripheral portion of the first flange portion and an outer peripheral portion of the second flange portion,
   the second slots are defined on the first flange portion and the second flange portion,
   the second flange portion has an axial opening at a center of the second flange potion, the axial opening defining a hole such that the hole is capable of receiving the second shaft and the circular bracket portion into the hole, and the second slots of the second flange portion and the hole are continuously connected to each other so that the rods can be inserted into the second slots of the second flange portion.

4. An electric power steering apparatus according to claim 2, wherein the first shaft has a portion on an outer annular surface of the first shaft that defines a hollow, the tubular bracket portion has a portion that defines a swaged portion, and the first shaft and the second detecting member are swaged together at the hollow and a swaged portion.

5. An electric power steering apparatus according to claim 1, further comprising a spacing member provided between the yokes, the spacing member positioning the detecting coils so that the spacing member maintains an axial spacing between the detecting coils.

6. An electric power steering apparatus according to claim 5, wherein the spacing member has a stepped portion that receives the yokes.

7. An electric power steering apparatus according to claim 6, wherein the spacing member has a large inner diameter portion whose diameter is approximately the same as an outer diameter of the yokes, and a small inner diameter portion whose diameter is smaller than the large inner diameter portion and is larger than an outer diameter of the first detecting member.

8. An electric power steering apparatus according to claim 1, wherein the housing comprises a first housing located approximately about the first shaft and a second housing located approximately about the second shaft.

9. An electric power steering apparatus according to claim 8, further comprising:

a first locking member provided between the yokes and the spacing member, the first locking member preventing a relative shift between the yokes and the spacing member; and a second locking member provided between the spacing member and the first housing, the second locking member preventing a relative shift between the spacing member and the first housing.

10. An electric power steering apparatus according to claim 9, wherein the first locking member is a first projection on either of the yokes or the spacing member and a portion defining a complementary first axial notch on the spacing member or the yokes; and wherein the second locking member is a second projection on either of the spacing member or the first housing and a portion defining a complementary second axial notch on the spacing member or the first housing.

11. An electric power steering apparatus according to claim 8, further comprising a disk spring provided between the first housing and one of the yokes.

12. An electric power steering apparatus according to claim 1, wherein the housing comprises a first housing located approximately about the first shaft, a second housing located approximately about the second shaft, and an intermediate housing located between the first housing and the second housing.

13. An electric power steering apparatus according to claim 12, further comprising a spacing member provided between the yokes and the intermediate housing, the spacing member positioning the yokes so that the spacing member maintains an axial spacing between the yokes and the intermediate housing.

14. An electric power steering apparatus according to claim 13, wherein the intermediate housing has a stepped portion that receives the spacing member.

15. An electric power steering apparatus according to claim 14, wherein the spacing member is positioned between the first housing and the stepped portion of the intermediate housing.

16. An electric power steering apparatus according to claim 12, wherein the first detecting member is covered by the first housing and not covered by the intermediate housing.

17. A method of assembling producing an electric power steering apparatus comprising the steps of:

connecting a first shaft to an end of an elastic member;

connecting a second shaft to the other end of the elastic member, the second shaft having a worm wheel;

thereafter assembling an electric motor for generating steering assistance power, the electric motor having an output shaft and a worm shaft connected to the output shaft of the electric motor, the worm wheel meshing with the worm shaft so that steering assistance power is transmitted from the electric motor to the second shaft;

installing a torque sensor on the first shaft and the second shaft, wherein the torque sensor comprises:

a first detecting member provided on the second shaft, the first detecting member being made of magnetic material and having a plurality of radial notched portion that defines first slots, the first slots provided on at least one side of the first detecting member so that the first slots are spaced around the first detecting member;

a pair of second detecting members provided on both sides of the first detecting member so that the first detecting member is axially sandwiched between the second detecting members, the second detecting member being made of conductive and non-magnetic material and having a plurality of radial notched portions that defines second slots so the second slots are spaced around the second detecting members;

a pair of detecting coils axially provided on both sides of the first detecting member and the second detecting member so that the first detecting member and the second detecting members are sandwiched between the detecting coils, the detecting coils capable of detecting a variation of torque generating between the first shaft and the second shaft based on a change in impedance of the detecting coils wherein the change in impedance varies according to a variation of an over lap between the first slots and the second slots; and a pair of yokes made of magnetic material, each of the yokes accommodating one of the detecting coils so that each yoke partially surrounds the one of the detecting coil; and attaching a housing accommodating the first detecting member, the second detecting members, the detecting coils, and the yokes, wherein the yokes are fixed to the housing, and wherein the largest outer diameter of the first shaft is smaller than each of inner diameters of the first detecting member, the second detecting member and the yokes.

18. A method of claim 17, wherein the second detecting member is assembled after the first detecting member is installed on the second shaft.

19. A method of claim 17, further comprising the steps of swaging the second detecting member onto the second shaft.

20. A method of claim 17, wherein the torque sensor further comprises a spacing member between the yokes, the spacing member positioning the detecting coils so that the spacing member maintains an axial spacing between the detecting coils.

* * * * *